Dec. 2, 1958  A. A. MEYER  2,862,410
POSITION INDICATING MECHANISM
Filed July 16, 1956  3 Sheets-Sheet 3
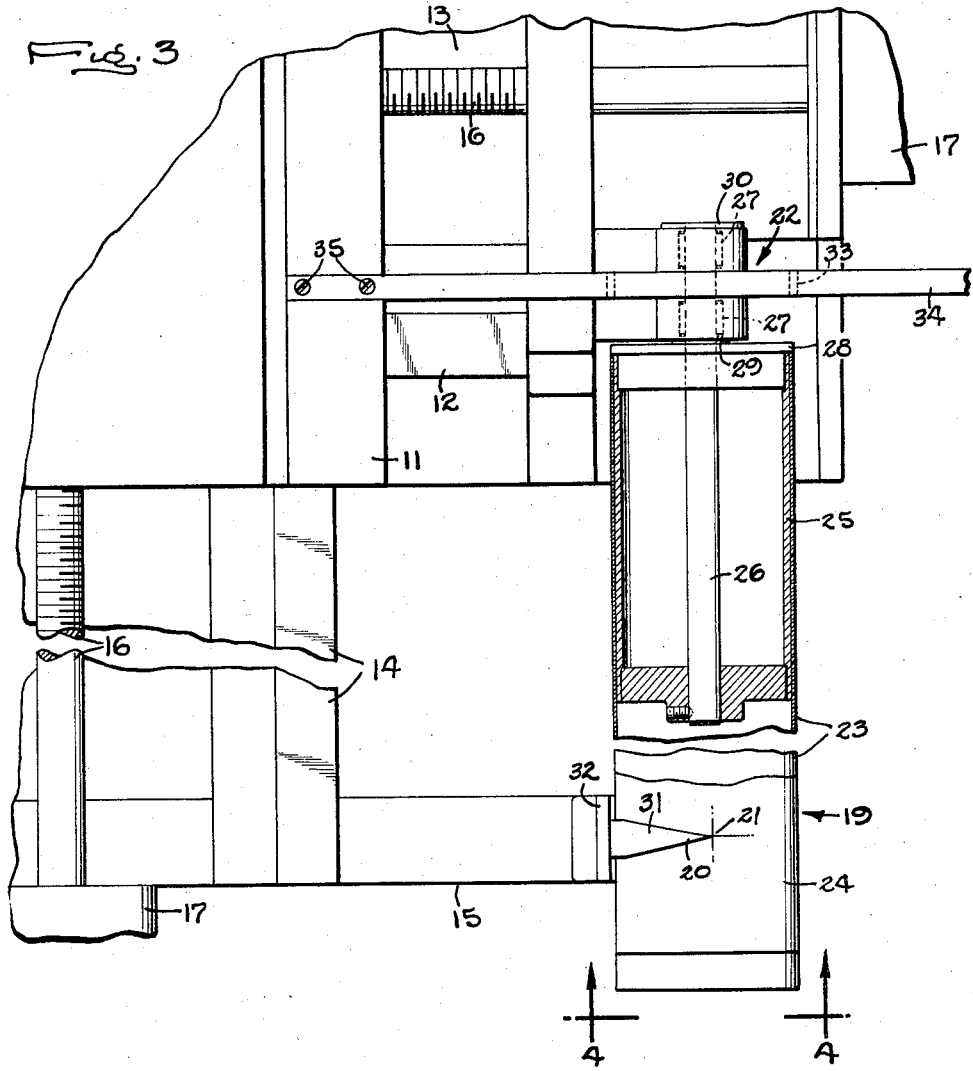
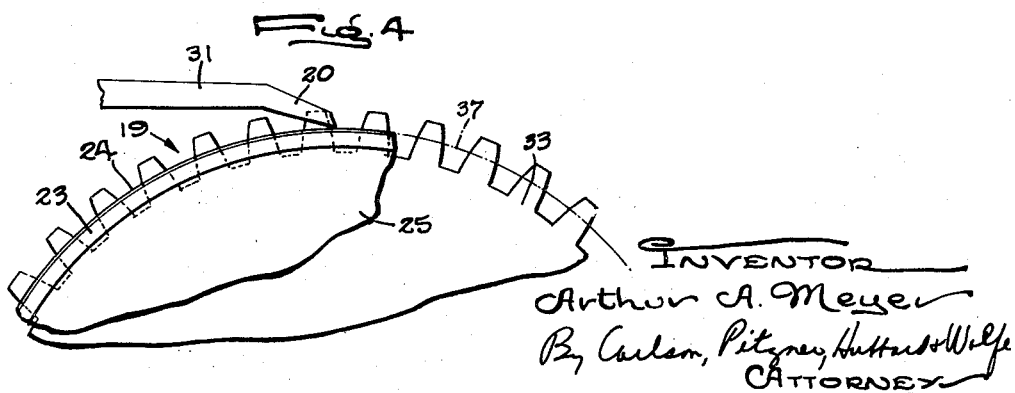
INVENTOR
Arthur A. Meyer
By Carlson, Pitzney, Hubbard & Wolfe
ATTORNEY

United States Patent Office 2,862,410
Patented Dec. 2, 1958

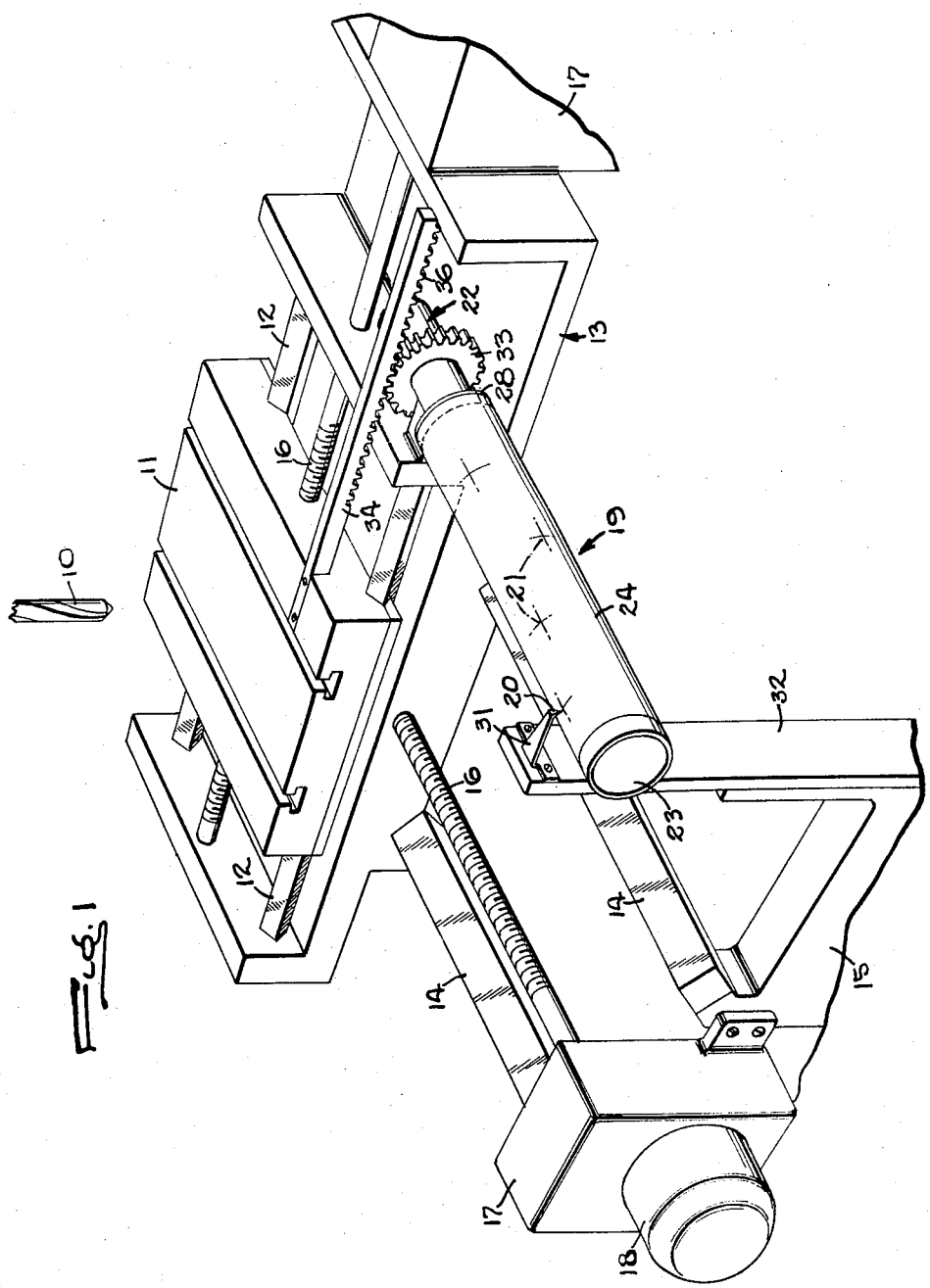

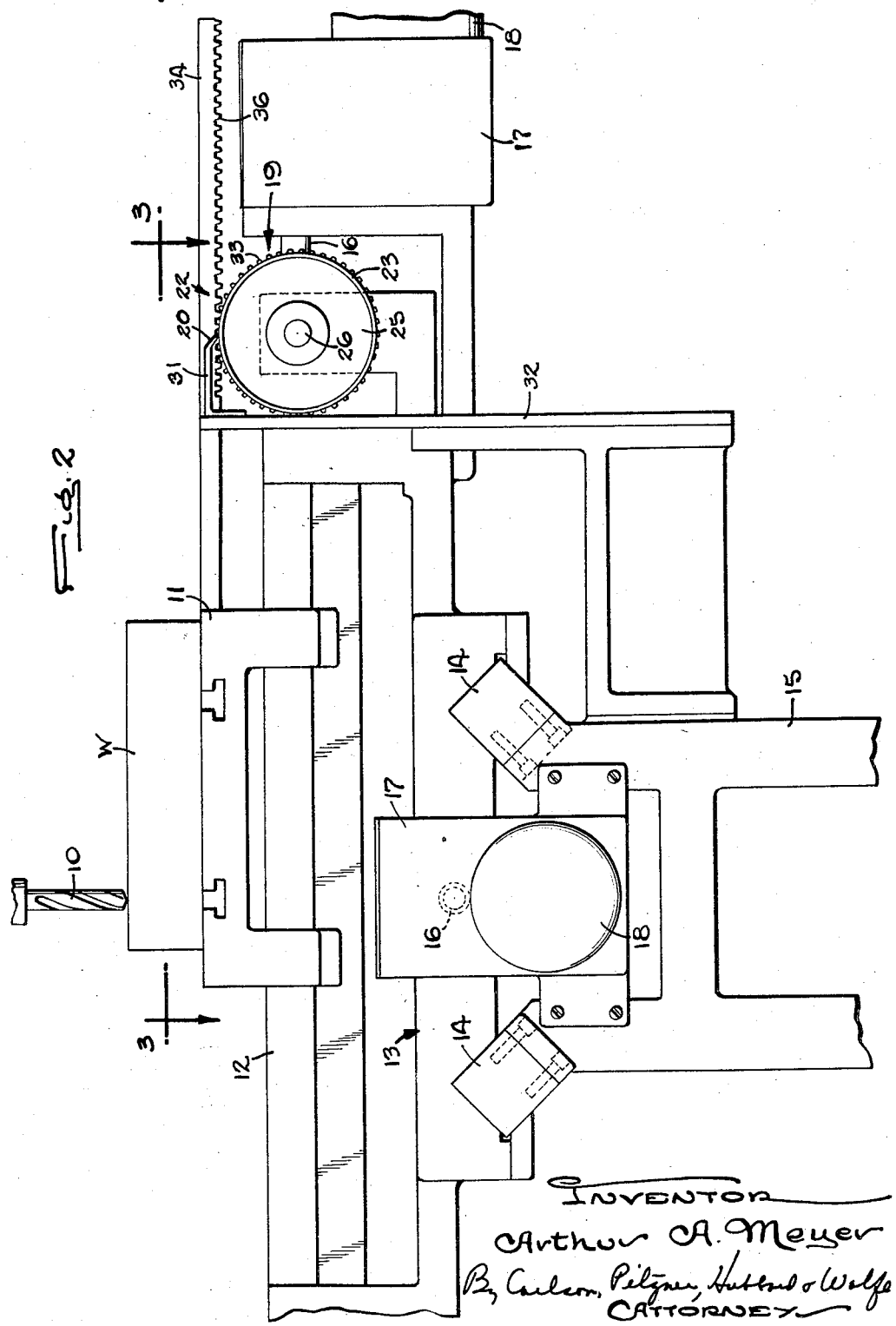

2,862,410

POSITION INDICATING MECHANISM

Arthur A. Meyer, Beloit, Wis., assignor to Warner Electric Brake & Clutch Company, South Beloit, Ill., a corporation of Illinois Application July 16, 1956, Serial No. 598,006

7 Claims. (Cl. 77—63)

This invention relates generally to machines in which a tool support and a work support are movable rectilinearly relative to each other in perpendicular directions. More particularly, the invention relates to mechanism for indicating the relative positions of the tool and work supports where one of the latter is stationary and the other is a slide reciprocable along one path on an intermediate slide which is reciprocable along a generally perpendicular path.

The general object of the invention is to provide novel indicating mechanism which, as compared to prior mechanism of the above character, is of simpler construction, occupies less space, and may be observed more easily by the machine operator.

Another object is to provide a novel rotary layout member which, in response to movement of one of the supports in the different transverse directions, respectively rotates and shifts bodily relative to a pointer rigid with the other support.

A more detailed object is to mount the layout member on the intermediate slide and connect the same to one of the supports in a novel manner for bodily movement with the slide and rotation relative to the latter and the pointer in synchronism with the relative movements of the supports.

Other objects and advantages of the invention will become apparent from the following detailed description taken in connection with the accompanying drawings, in which Figure 1 is a fragmentary perspective view of a machine including indicating mechanism embodying the novel features of the present invention.

Fig. 2 is a fragmentary end elevational view of the machine.

Fig. 3 is a fragmentary plan view looking along the line 3—3 of Fig. 2 with some of the parts broken away and shown in section.

Fig. 4 is a fragmentary end view of the layout member taken along the line 4—4 of Fig. 3 with some of the parts broken away.

The invention is shown in the drawings for purposes of illustration embodied in a drilling machine having a drill 10 supported for rotation about a fixed vertical axis and reciprocated along the latter and into and out of a workpiece W clamped against the top of a work table 11. The latter is reciprocable horizontally in one direction on guides 12 carried by a slide 13 which is reciprocable horizontally in a perpendicular direction along guides 14 rigid with a stationary base 15. Reciprocation of the table and the slide along their respective guides to position different parts of the workpiece in alinement with the drill axis is effected herein by turning screws 16 threaded individually into the table and the slide and connected through gear boxes 17 to separate reversible electric motors 18 mounted on the slide and the base respectively and energizable selectively for rotation of the screws in opposite directions as is well known in the art.

In accordance with the present invention, novel means is provided for indicating the position of the table 11 relative to the base 15 and, thus, of the workpiece W relative to the fixed axis of the drill 10. This means comprises generally a layout member 19 and a pointer 20 supported closely adjacent but movable relative to and past each other in synchronism with relative movements of the base and the table, the position of the pointer with respect to the member corresponding to the position of the drill axis with respect to the work. To provide a large area while occupying little space, the layout member is formed as a cylinder having on its periphery indicia 21 (Figs. 1 and 3) of the different desired positions of the table and supported on the slide 13 for rotation relative thereto about a fixed axis and for movement therewith longitudinally of the axis and relative to the pointer. Rotation of the cylinder corresponds to movement of the table along one transverse path and is effected in proportion to such movement through a connection 22 with one of the base and table members the other one of which supports the pointer.

While the indicia 21 may constitute different coordinates of a plotting chart affixed permanently on the periphery of the layout cylinder 19, the latter in this instance comprises a hollow cylindrical tube 23 with a separate sheet such as a blueprint 24 wrapped around and detachably secured to its periphery, the indicia comprising center markings on the blueprint. The hollow tube 23 herein is formed of cardboard and telescopes closely over an inner supporting drum 25 (Fig. 3) of cylindrical shape which is fast on a shaft 26. Axially spaced bearings 27 carried by the slide 13 are disposed on opposite sides of the pinion and rotatably support a projecting end portion of the shaft. Location of the tube accurately along the drum is effected by a flange 28 projecting outwardly from one end of the drum to abut one end of the tube 23 as shown in Fig. 3, the tube having a close friction fit with the drum to avoid slippage relative thereto. A hub 29 on the drum and a collar 30 secured to the projecting end of the shaft abut the bearings to hold the drum against axial movement out of a desired position relative to the slide.

To facilitate observation of the relative positions of the indicia 21 and the pointer 20, the latter preferably is stationary with the layout cylinder 19 movable both angularly about its axis and along the latter past the pointer. Herein, the pointer comprises a downwardly bent tapering end portion of one leg of an L-shaped bracket 31 having its other leg secured to a post 32 rigid with and upstanding from the base 15.

With the pointer 20 stationarily mounted on the base 15, the axis of the layout cylinder 19 parallels the guides 14 on the base and thereby the rectilinear path of the slide 13 defined thereby. Also, the connection 22 is interposed between the cylinder and the table 11 for converting the linear motion of the latter along its path defined by the guides 12 to rotary motion of the cylinder. Such conversion is effected simply by utilizing as the connection a pinion 33 fast on the cylinder shaft 26 and a straight rack bar 34 having one end embedded in and secured as by screws 35 to the table. The other end portion of the bar projects horizontally from the table in parallel with the guides and is formed with teeth 36 which mesh with the pinion teeth for displacing the blueprint circumferentially by an amount proportional to the linear displacement of the table. To displace the periphery of the layout cylinder and thereby the indicia 21 circumferentially by an amount equal to the linear displacement of the table along its guides, the diameter of the outer surface of the blueprint 24 is equal to the diameter of the pitch circle 37 of the pinion as shown in Fig. 4.

In preparing the indicating mechanism for operation, first the blueprint 24 is wrapped around the tube 23 and secured thereto as by clips or suitable adhesive, one edge of the print and the inner end of the tube being flush with each other. Next, with the work table and the slide in reference positions such as at one end of their paths of movement on the guides 12 and 14, the tube is telescoped over the drum 25 and into abutment with the flange 28 thereof while being located angularly on the drum to bring beneath the pointer 20 the one of the indicia which corresponds to the selected reference positions of the table and the slide. The indexing mechanism then is ready for use.

Assuming the table 11 and the slide 13 are in their limit positions at the upper left and the upper right respectively of Fig. 1, the movement of the table downwardly and to the right along the guides 12 is accompanied by rotation of the tube 23 and the blueprint 24 relative to the pointer in a clockwise direction as viewed in this figure. The circumferential displacement of the blueprint in this movement is the same as the linear displacement of the table because the diameter of the blueprint equals that of the pinion pitch circular. Upon turning of the screw 16 to shift the slide 13 downwardly and to the left, the blueprint shifts bodily therewith the same distance and in the same direction longitudinally of the drum axis. The blueprint thus shifts relative to the pointer to bring the different indicia under the latter when the table is in corresponding positions relative to the base and the axis of the drill 10.

It will be apparent that, due to conversion of linear motion of the table 11 along one of its transverse paths to rotary motion of the layout cylinder 19, the same member may be utilized with the pointer 20 to indicate the table position along both of its paths while requiring less space than the table and permitting the pointer to be disposed close to the operator for easy observation. With the pointer stationary and the layout member movable both axially and angularly relative thereto, the operator may observe the position of the table along both paths simply by watching a single point. The novel rack and pinion connection 22 between the layout cylinder 19 and the table not only is of simple construction but also enables the member to follow the table movement closely for accurate indications of the table positions.

I claim as my invention:

1. In a machine, the combination of, a base, a slide guided on said base for rectilinear reciprocation along a first path, a support guided on said slide for rectilinear reciprocation along a second path extending perpendicularly of said first path, a layout cylinder journaled on said slide for rotation about an axis fixed relative to the slide and paralleling said first path, said cylinder being fixed against movement axially of said slide to move in unison therewith along said first path, a pinion secured to and axially alined with said cylinder, a rack bar secured to said support in parallel with said second path and meshing with said pinion for rotation of said cylinder in synchronism with movement of the support relative to said slide along said second path, and a pointer secured to said base and projecting therefrom to a position adjacent the periphery of said cylinder for cooperation with indicia on the cylinder to indicate the position of said support relative to the base.

2. The apparatus defined in claim 1 in which the diameter of said periphery of said cylinder is equal to the pitch diameter of said pinion whereby the peripheral displacement of the cylinder equals the linear displacement of said support relative to said slide.

3. In a machine, the combination of, a base, a slide guided on said base for reciprocation along a first path, a support guided on said slide for reciprocation along a second path extending perpendicularly of said first path, a cylindrical layout member movable bodily with said slide along said first path and journaled on the slide for rotation relative thereto about an axis paralleling the slide, a connection between said cylinder and said support operable to convert the reciprocating motion of the latter along said second path to rotary motion of the cylinder about said axis and effect a peripheral displacement of the cylinder proportional to the linear displacement of the support, and a pointer rigid with said base and projecting therefrom to a position adjacent the periphery of said cylinder for cooperation with indicia thereon to indicate the position of said support relative to said base.

4. For use with a machine having a base member, a slide guided on said base member for reciprocation along a first path, and a support member guided on said slide for reciprocation along a second path extending in a direction perpendicular to said first path, the combination of a cylindrical layout element mounted on said slide for rotation about an axis paralleling one of said paths, a pointer connected to one of said members to project therefrom adjacent the periphery of said layout element, a pinion axially alined with and secured to said layout element, and a rack bar meshing with said pinion and connected to the other of said members for rotation of the element to move indicia thereon past said pointer in synchronism with relative movement of the other member and said slide longitudinally of the other of said paths, said pointer and said element moving relative to each other longitudinally of said axis as an incident to relative movement of the element and said one member longitudinally of said one path.

5. In a machine, the combination of, a base member, a slide supported on said base member for reciprocation back and forth along a first path, a support member mounted on said slide for reciprocation back and forth along a second path extending perpendicularly of said first path, a cylindrical layout element journaled on said slide for rotation about an axis parallel to one of said paths, a pointer mounted on one of said members and projecting therefrom to a position adjacent the periphery of said layout element, and a connection between the other of said members and said layout element operable to rotate the latter in synchronism with relative movement of the member and said slide longitudinally of the other of said paths, said pointer and said element moving relative to each other longitudinally of said axis as an incident to relative movement of the element and said one member longitudinally of said one path.

6. The combination of claim 5 in which said connection comprises a pinion axially alined with and secured to said layout element and a rack secured to said other member and meshing with said pinion for rotation of the element in synchronism with relative movement of the member and said slide longitudinally of said other path.

7. In a machine, the combination of, a base member, a slide supported on said base member for reciprocation back and forth along a first path, a support member mounted on said slide for reciprocation back and forth along a second path extending perpendicularly of said first path, a cylindrical layout element supported for rotation about an axis parallel to a first one of said paths and connected to said slide to move along the axis in unison with movement of the slide along the first path, a pointer mounted on one of said members and projecting therefrom to a position adjacent the periphery of said layout element, and a connection between the other of said members and said layout element operable to rotate the latter about said axis in synchronism with relative movement of the member and said slide longitudinally of the other of said paths, said pointer and said element moving relative to each other longitudinally of said axis as an incident to relative movement of the element and said one member longitudinally of said one path.

References Cited in the file of this patent

UNITED STATES PATENTS

| | | |
|---|---|---|
| 1,396,302 | Wagner | Nov. 8, 1921 |
| 1,863,007 | Elkins | June 14, 1932 |

FOREIGN PATENTS

| | | |
|---|---|---|
| 41,618 | Switzerland | June 2, 1908 |